United States Patent
Wulfe et al.

(10) Patent No.: US 11,577,759 B2
(45) Date of Patent: Feb. 14, 2023

(54) SYSTEMS AND METHODS FOR HYBRID PREDICTION FRAMEWORK WITH INDUCTIVE BIAS

(71) Applicant: TOYOTA RESEARCH INSTITUTE, INC., Los Altos, CA (US)

(72) Inventors: Blake Warren Wulfe, San Francisco, CA (US); Jin Ge, Santa Clara, CA (US); Jiachen Li, Albany, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 248 days.

(21) Appl. No.: 16/883,774

(22) Filed: May 26, 2020

(65) Prior Publication Data

US 2021/0370990 A1 Dec. 2, 2021

(51) Int. Cl.
*B60W 60/00* (2020.01)
*B60W 30/095* (2012.01)
*G05D 1/02* (2020.01)
*G05D 1/00* (2006.01)

(52) U.S. Cl.
CPC .. *B60W 60/00274* (2020.02); *B60W 30/0956* (2013.01); *B60W 60/0015* (2020.02); *B60W 60/00272* (2020.02); *G05D 1/0088* (2013.01); *G05D 1/0214* (2013.01); *B60W 2554/20* (2020.02); *B60W 2554/4046* (2020.02); *B60W 2554/80* (2020.02); *B60W 2556/10* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 9,429,650 B2 | 8/2016 | Zeng | |
| 2019/0147335 A1* | 5/2019 | Wang | G05D 1/0257 706/20 |
| 2019/0152490 A1 | 5/2019 | Lan | |
| 2019/0217857 A1 | 7/2019 | Sorin | |
| 2020/0110416 A1* | 4/2020 | Hong | G01S 13/865 |
| 2021/0082283 A1* | 3/2021 | Malla | G05B 13/027 |

FOREIGN PATENT DOCUMENTS

| | | |
|---|---|---|
| CN | 107180530 | 9/2017 |
| DE | 102018203583 | 9/2019 |
| WO | 2019083978 | 5/2019 |

* cited by examiner

*Primary Examiner* — Tamara L Weber
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for implementing hybrid prediction. Hybrid prediction integrates two deep learning based trajectory prediction approaches: grid-based approaches and graph-based approaches. Hybrid prediction techniques can achieve enhanced performance by combining the grid and graph approaches in a manner that incorporates appropriate inductive biases for different elements of a high-dimensional space. A hybrid prediction framework processor can generate trajectory predictions relating to movement of agents in a surrounding environment based on a prediction model generating using hybrid prediction. Trajectory predictions output from the hybrid prediction framework processor can be used to control an autonomous vehicle. For example, the autonomous vehicle can perform safety-aware and autonomous operations to avoid oncoming objects, based on the trajectory predictions.

19 Claims, 7 Drawing Sheets

SYSTEMS AND METHODS FOR HYBRID PREDICTION FRAMEWORK WITH INDUCTIVE BIAS

TECHNICAL FIELD

The present disclosure relates generally to a hybrid prediction system and techniques for improved prediction accuracy and sample efficiency by incorporating inductive biases. In particular, some implementations may relate to trajectory and/or behavior prediction for controllers usable in autonomous systems, such as autonomous vehicle control systems.

DESCRIPTION OF RELATED ART

Accurate prediction (e.g., behavior prediction, trajectory prediction) is often times a prerequisite for safe planning. Furthermore, in order to achieve accurate prediction in certain real-world situations, accounting for interactions with other agents within a spatial area may be required. For example, with respect to vehicles, forced merges and keeping clear zones involves interactions between multiple vehicles. Accordingly, considering the movement of multiple vehicles may be needed to accurately predict trajectories in those situations. In other words, predictions related to these interactions are based on the states of other agents. Models, such as models based on Graph Neural Networks (GNN), may be applied to behavior prediction (e.g., behavior prediction models) in a manner that accounts for such interactions including the states of other agents.

BRIEF SUMMARY OF THE DISCLOSURE

In accordance with an embodiment of the disclosed technology a system is described including a hybrid prediction framework processor. The hybrid prediction framework processor generates trajectory predictions relating to movement of agents in a surrounding environment based on a prediction model. The system also includes a controller device. The controller device receives the trajectory predictions as output from the hybrid prediction framework processor and perform safety-aware and autonomous operations of the system in response to the trajectory predictions.

In accordance with another embodiment of the disclosed technology a hybrid prediction method. The method can include extracting one or more deep features from information relating to multiple interactive agents. The one or more deep features are associated with a grid including a spatial representation of the interactive agents. The method can further include generating a graph based on the extracted features. The graph includes the spatial representation from the grid via the extracted features. Additionally, the method can include updating the graph with updated node features, where the updated node features relate to the multiple interactive agents. Then, the method can predict trajectories related to the interactive agents based on the updated graph.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As disclosed herein, the hybrid prediction system and techniques can be generally described as a integration of two deep learning based trajectory prediction approaches: grid-based approaches and graph-based approaches. By employing a hybrid of the aforementioned approaches, the disclosed hybrid prediction techniques can achieve better performance in terms of prediction accuracy and sample efficiency by combining the aforementioned techniques in a manner that incorporates appropriate inductive biases for different elements of a high-dimensional space.

Figure 1A:
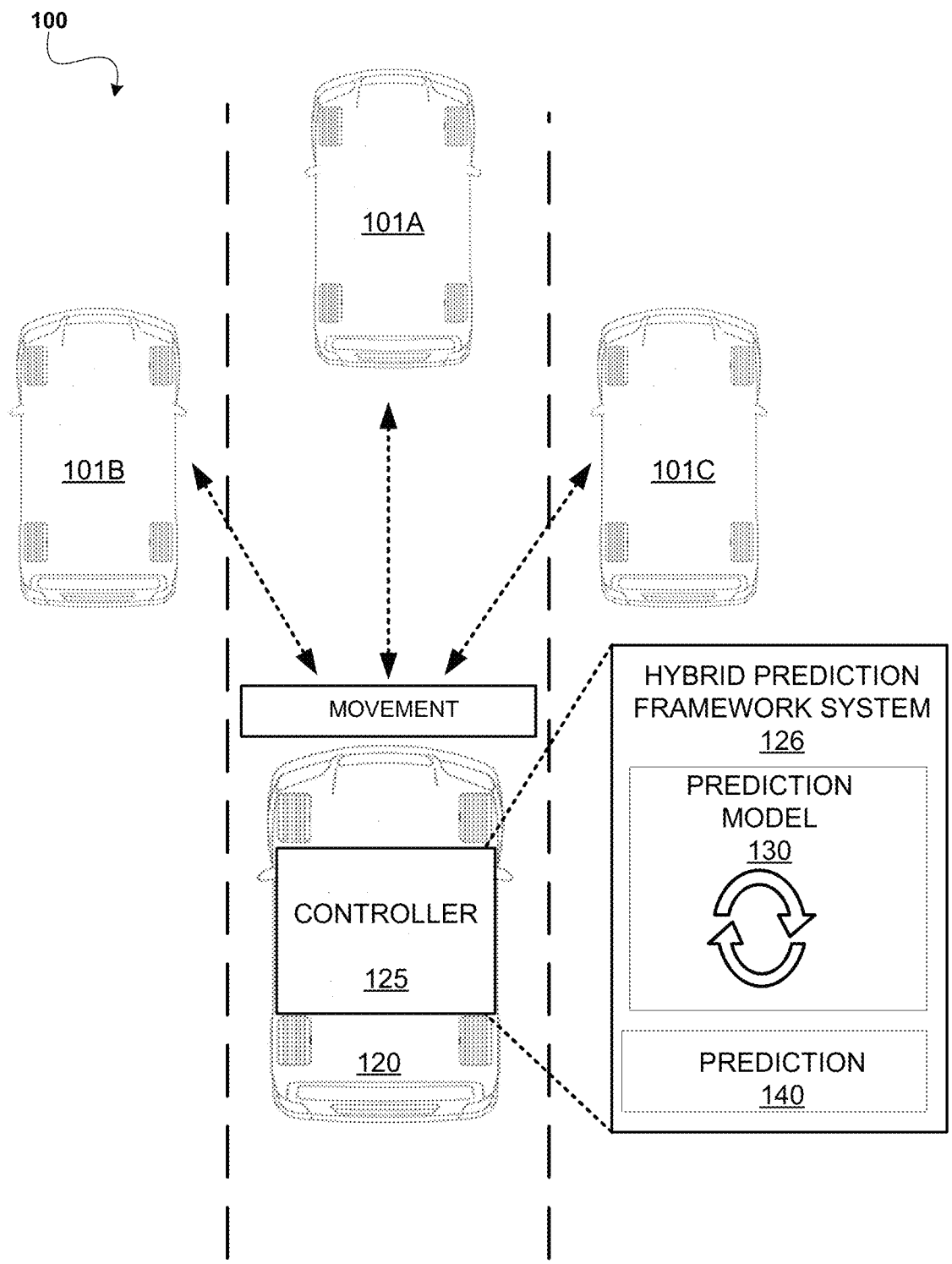
FIG. 1A is an example environment in which a hybrid prediction framework system, as implemented in an autonomous vehicle for example, can be implemented within a controller, in accordance with an embodiment of the technology disclosed herein.

FIG. 1A illustrates an example environment 100 in which an autonomous system, shown as autonomous vehicle 120 for example, implements hybrid prediction. As referred to herein, trajectory prediction involves analysis of the movement and/or patterns of different dynamic agents in order to predict their future trajectories. Trajectory prediction is applicable to various environments in which the movement of dynamic objects can be analyzed and predicted. However, for purposes of discussion, hybrid prediction is discussed with respect to vehicles, and namely the autonomous vehicle 120.

To safely and efficiently navigate in complex urban traffic, autonomous vehicle 120 can employ the hybrid prediction framework system 120 for predictions in relation to surrounding traffic-agents (vehicles, bicycles, pedestrians, etc.). In FIG. 1A, agents surrounding the autonomous vehicle 120 are shown as vehicles 101A-101C. A challenging and critical task is to explore the movement patterns of different traffic-agents and predict their future trajectories accurately to help the autonomous vehicle make reasonable navigation decisions. To address these challenges, the hybrid prediction framework system 126 implements enhanced trajectory prediction by integrating grid-based prediction and graph-based prediction approaches. In detail, the hybrid prediction framework system 126 combines grid-based prediction and graph-based prediction in a distinct manner that achieves optimization, such as improved performance and sample efficiency, by virtue of gleaning the advantages of both.

Grid-based prediction approach and graph-based prediction approach use deep learning as the basis for trajectory prediction. The grid-based prediction approach involves projecting the state of agents into a high dimensional grid tensor. The graph-based prediction approach represent the world information as a graph, where each node corresponds to an agent and features of the environment (e.g., road) and each edge describes the relation between the linked nodes (agents). The hybrid prediction framework system 126 distinctly leverages these different approaches for representing the physical world. As a result, the hybrid prediction framework system 126 performs aspects of grid-based prediction which is optimized for representing the world in terms of spatial information (e.g., X-Y locations within grid cells) such as lane lines, keep clear zones, general roadway geometry. The hybrid prediction framework system 126 also performs aspects of graph-based prediction which is optimized for representing the world as objects and thusly in terms of relationships between objects.

The inductive biases are assumptions encoded in learning based models or learning algorithms. In multi-agent learning systems, relational inductive biases can be incorporated to impose constraints on the relations and interactions among different entities. In recent years, more and more attention have been paid to graph neural networks, which can involve arbitrary relational inductive bias with the property of node, edge permutation invariance. Graph-based models can be applied to model interactions among entities in physical systems, such as moving people as well as on-road vehicles, in manner that also considers inductive biases. Furthermore, by finding an optimal combination of inductive biases, the training time and the overall performance of the trained model can be improved. The disclosed hybrid prediction system and techniques can realize such advantages by combining grid-based approaches and graph-based approaches and their inductive biases. As alluded to above, vehicle 120 in the environment 100 has the capability to be autonomously driven. In the example, the vehicle 120 can be configured to automatically maneuver, or otherwise to be automatically drive-controlled, in a manner that is governed by one or more safety constraints (e.g., target lead/trail distance, target speed, etc.) principally focused to "avoid collision" during operation in its current environment 100, which is illustrated in FIG. 1A. The vehicle 120 is shown to include controller 125, which can implement the hybrid prediction techniques as semi-autonomous (e.g., partially computer-controlled) or fully autonomous operations for a vehicle. Although the disclosed hybrid prediction techniques are described herein in relation to vehicles, for purposes of illustration, it should be appreciated that these techniques are applicable to various forms of systems and/or elements that may leverage AI-based software for implementing autonomous functionality involving trajectory prediction, such as software applications, robotics, medical devices, and the like.

FIG. 1A generally illustrates a vehicle 120 traveling on a roadway, where vehicle 120 is shown to include hybrid prediction capabilities implemented by the hybrid prediction framework system 126 portion of the controller 125. The hybrid prediction framework system 126 is further shown to include a prediction model 130 and generating trajectory prediction results 140. As referred to herein, machine learning can be described as a subfield of AI. In general, ML is an automated computer processes that can intelligently leverage data analysis for training itself for further optimizing the processes. AI techniques can include various approaches that are used in the area to achieve automated data analysis, such as neural networks (discussed in greater detail in reference to FIG. 4 and FIG. 5), automated reasoning analysis (e.g., satisfiability modulo theories), and so on. AI-based techniques can be used to enhance computer-controlled features of vehicles in a manner that improves driving safety (e.g., a reduction of potential crashes), provides uniform traffic flow, and optimizes driving performance of vehicles (e.g., fuel efficiency) for a practical application and/or operation environment, for example environment 100.

Also, the vehicle 120 can utilize aspects of AI/ML, to utilize an autonomous self-training process for the hybrid prediction framework system 126. An autonomous training process for the prediction model 130 can be used, which observes the movement of dynamic agents (e.g., pedestrians, other vehicles, bicycles) that may be encountered by the vehicle 120 over time, in order to tune the prediction model 140 for making future trajectory predictions. For example, the vehicle 120 can utilize multiple vehicle sensors (e.g., cameras) to passively collect data relating to the surrounding environment and movement of agents on the roadway, which can be used to adjust the weights of a neural network of the prediction model 130. It should be appreciated that tuning the prediction model 140 can be considered an aspect of pre-process, meaning that the prediction model 140 is tuned "offline" (prior to being used) or not in operational real-time (e.g., off the vehicle).

In operation, the vehicle 102 can use the hybrid prediction framework system 126 to effectively predict the trajectory of agents that are sharing the roadway, shown as vehicles 101A-101C. For instance, predictions 140 relating to the trajectory of each of the proximate vehicles 101A-101C can be communicated by the hybrid prediction framework system 126 as a result to the controller 125. The prediction 140 can indicate that one of the vehicles, for example vehicle 101C is moving left towards vehicle 120. In other words, the hybrid prediction framework system 126 can predict, based on the vehicle's 101C current movements, that it is changing lanes in a manner that may potentially obstruct and/or collide with vehicle 120. Accordingly, based on the prediction 140, the controller 125 can specifically guide the vehicle 120 to achieve safe maneuvering, namely to avoid collision. As an example, the controller 125 can activate one or more automatic actions of vehicle 120 in response to trajectory predictions of the hybrid prediction framework system 126, such as engaging a brake, swerving, adjusting speed, and the like, in order to avoid colliding into other vehicles 101A-101C that may be currently sharing the roadway and proximately located to vehicle 120. In another embodiment, the controller 125 may not effectuate autonomous maneuvering of the vehicle 120. As an example, in response to the hybrid prediction framework system 126 determining that a predicted trajectory may impact safety, the controller 125 can generate an alert to the driver to take action manually.

In some embodiments, the hybrid prediction capabilities are implemented as an operational mode for vehicle 120. That is, a driver of vehicle 120 may be able to selectively activate or deactivate a hybrid prediction mode as desired. For the purposes of discussion, vehicle 120 is described in reference to FIG. 1A having the hybrid prediction mode activated, thereby enabling it to perform the safety-aware autonomous maneuvering techniques. As used herein, a "vehicle" is any form of motorized transport. In the illustrated example, vehicle 120 and the plurality of nearby vehicles 101A-101C are automobiles. For purposes of illustration, the embodiments will be described here with respect to automobiles. However, it should be appreciated that the hybrid prediction techniques disclosed herein are not limited to automobiles. The systems and methods disclosed herein may be implemented with any of a number of different vehicles and vehicle types. For example, the hybrid prediction systems and methods disclosed herein may be used with automobiles, trucks, motorcycles, boats, recreational vehicles and other like on- or off-road vehicles. In addition, the principals disclosed herein may also extend to other vehicle types as well.

According to an embodiment, vehicle 120 can be an autonomous vehicle. As used herein, "autonomous vehicle" means a vehicle that configured to operate in an autonomous operational mode. "Autonomous operational mode" means that one or more computing systems of the vehicle 120 are used to navigate and/or maneuver the vehicle along a travel route with a level of input from a human driver which varies with the operational mode. As such, vehicle 120 can have a plurality of autonomous operational modes, where each more correspondingly responds to the controller 125 with a varied level of automated response. In some embodiments, the vehicle 120 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 120, the safety-aware AI techniques and response can be highly, or fully, automated. For example, the controller 125 can be configured to communicate controls so as to operate the vehicle 120 autonomously and safely. After the controller 125 communicates a safety control to the vehicle 120 operating as an autonomous vehicle, the vehicle 120 can automatically perform the necessary adjustments (e.g., accelerating or decelerating) with no human driver interaction. Accordingly, vehicle 120 can operate with respect to the safety constraints 127 in a fully autonomous manner.

Alternatively, or in addition to the above-described modes, vehicle 120 can have one or more semi-autonomous operational modes. "Semi-autonomous operational mode" means that a portion of the navigation and/or maneuvering of the vehicle 120 along a travel route is performed by one or more computing systems, and a portion of the navigation and/or maneuvering of the vehicle 120 along a travel route is performed by a human driver. One example of a semi-autonomous operational mode is when an adaptive cruise control system is activated. In such case, the speed of a vehicle 120 can be automatically adjusted to maintain a safe distance from a vehicle ahead based on data received from on-board sensors, but the vehicle 120 is otherwise operated manually by a human driver. Upon receiving a driver input to alter the speed of the vehicle (e.g. by depressing the brake pedal to reduce the speed of the vehicle), the adaptive cruise control system is deactivated, and the speed of the vehicle is reduced. Thus, with vehicle 120 operating as a semi-autonomous vehicle, the hybrid prediction techniques and response can be partially automated. In an example, the controller 125 communicates a newly generated (or updated) control to the vehicle 120 operating as a semi-autonomous vehicle, under adaptive cruise control features. The vehicle 120 can automatically perform the some of the necessary adjustments (e.g., accelerating) with no human driver interaction. Alternatively, the vehicle 120 may notify a driver that driver input is necessary in response to a new (or updated) safety control.

For instance, upon detecting a predicted trajectory that impacts safety, such as potential collision (e.g., close proximity to another vehicle 101A-101C), vehicle 120 may be reduce the speed to ensure that the driver is travelling cautiously. In response, vehicle 120 can present a notification in its dashboard display that reduced speed is required, because of the safety constraints. The notification allows time for the driver to press the brake pedal and decelerate the vehicle 120 to travel at a speed that is safe.

Figure 1B:
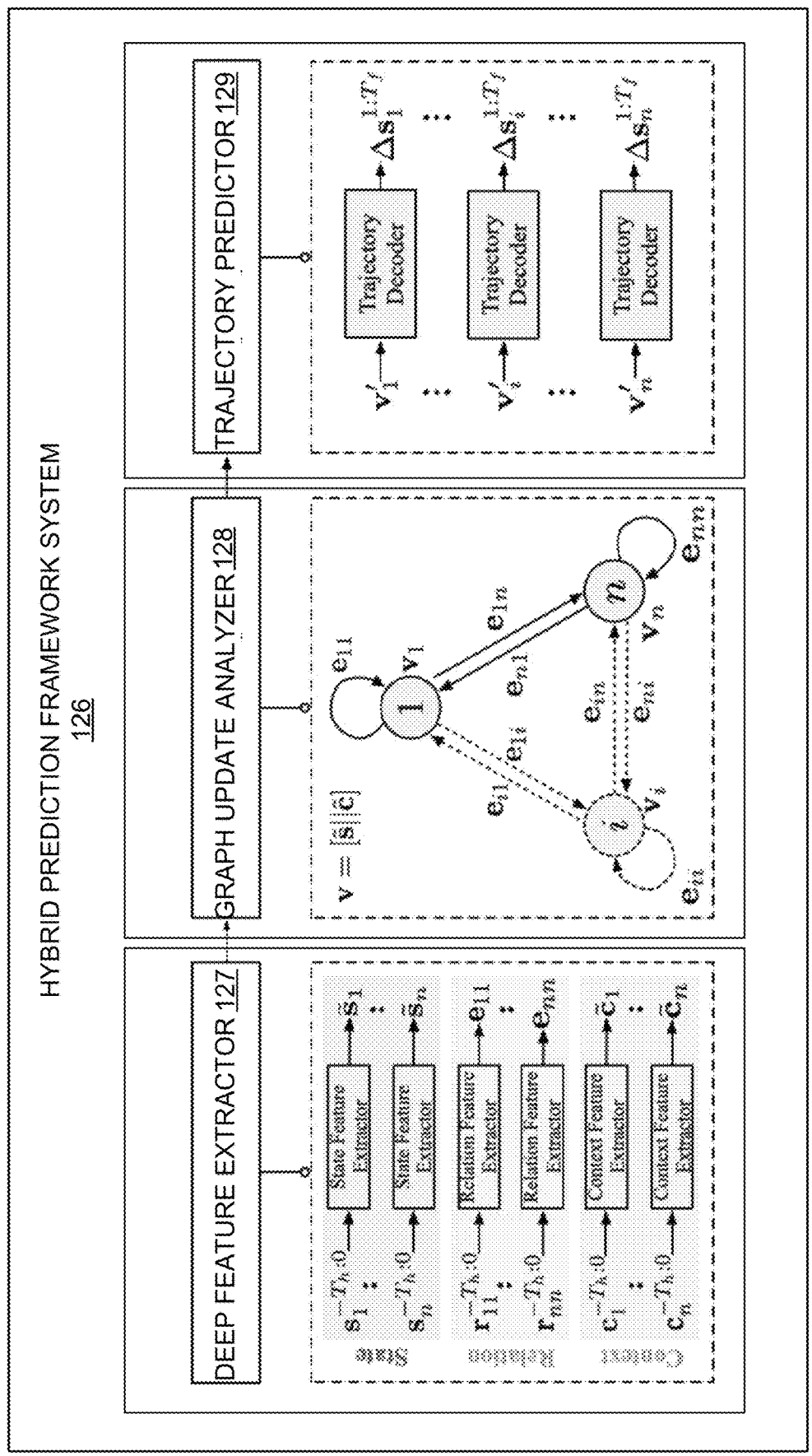
FIG. 1B is an example of a hybrid prediction framework system that may be implemented in an vehicle, as shown in FIG. 1A for example, which integrates a graph-based prediction approach, a grid-based prediction approach and inductive biases, in accordance with an embodiment of the technology disclosed herein.

FIG. 1B shows an example architecture of the hybrid prediction framework system 126, including various internal components. The hybrid prediction framework system 126 can be implemented as a hardware, software, or a combination thereof. For example, the hybrid prediction system 126 can be a hardware processor, including one or more general purpose microprocessors implements the various internal components. In the example of FIG. 1B, the architecture of the disclosed hybrid prediction framework system 126 includes a deep feature extractor (DFE) 127, a graph update analyzer 128, and trajectory predictor 129. The DFE 127 can be configured to extract deep features from a sequence of historical state, relation and context information of multiple interactive agents. Then, the extracted feature embeddings can be passed to the graph update analyzer 128. The graph update analyzer 128 can be configured to generate a graph to represent the world information based on the extracted features. Restated, the hybrid prediction framework system 126 can transform a spatial representation, as represented in a grid, into a format that can be used within a graph-based representation. For instance, certain spatial features from the grid (e.g., lane lines, keep clear zones, roadway geometry, traffic light information, roadway markings, etc.") can be extracted and translated into high level features that can be conceptually represented in the graph. This transformed information from the grid is added to a graph-based representation of the world. Consequently, graphs that are generated and analyzed by the hybrid prediction framework system 127 are augmented with spatial information (e.g., from the transformed grid) that may not have otherwise been captured by the graph-based approach itself. As an example, a portion of a roadway that is captured in a cell of a grid, can have features that are extracted from the grid (e.g., lane lines, keep clear zones, roadway geometry, traffic light information, roadway markings, etc) and subsequently represented as features (e.g., edge of a graph) within a graph. In other words, the grid-based approach and graph-based approach are combined by taking the position of an object (i.e., (x,y) position) and projecting that into the grid output. It should be appreciated that the "grid output" is the result of applying a convolutional neural networks (CNN) to the grid/spatial representation of the world, which is not reduced in spatial extent, but kept to the same size to allow for the later projection.

The graph update analyzer 128 can also compose any updates to the graph. The trajectory projector 129 can be configured to receive the graph and updated node features from the graph update analyzer 128 and generate future trajectories for all the involved agents (nodes). The nodes can be either deterministic or probabilistic. According to the embodiments, the highly flexible transformations in the framework 126 are implemented with differentiable neural networks thus can be trained end-to-end efficiently and consistently.

Figure 2:
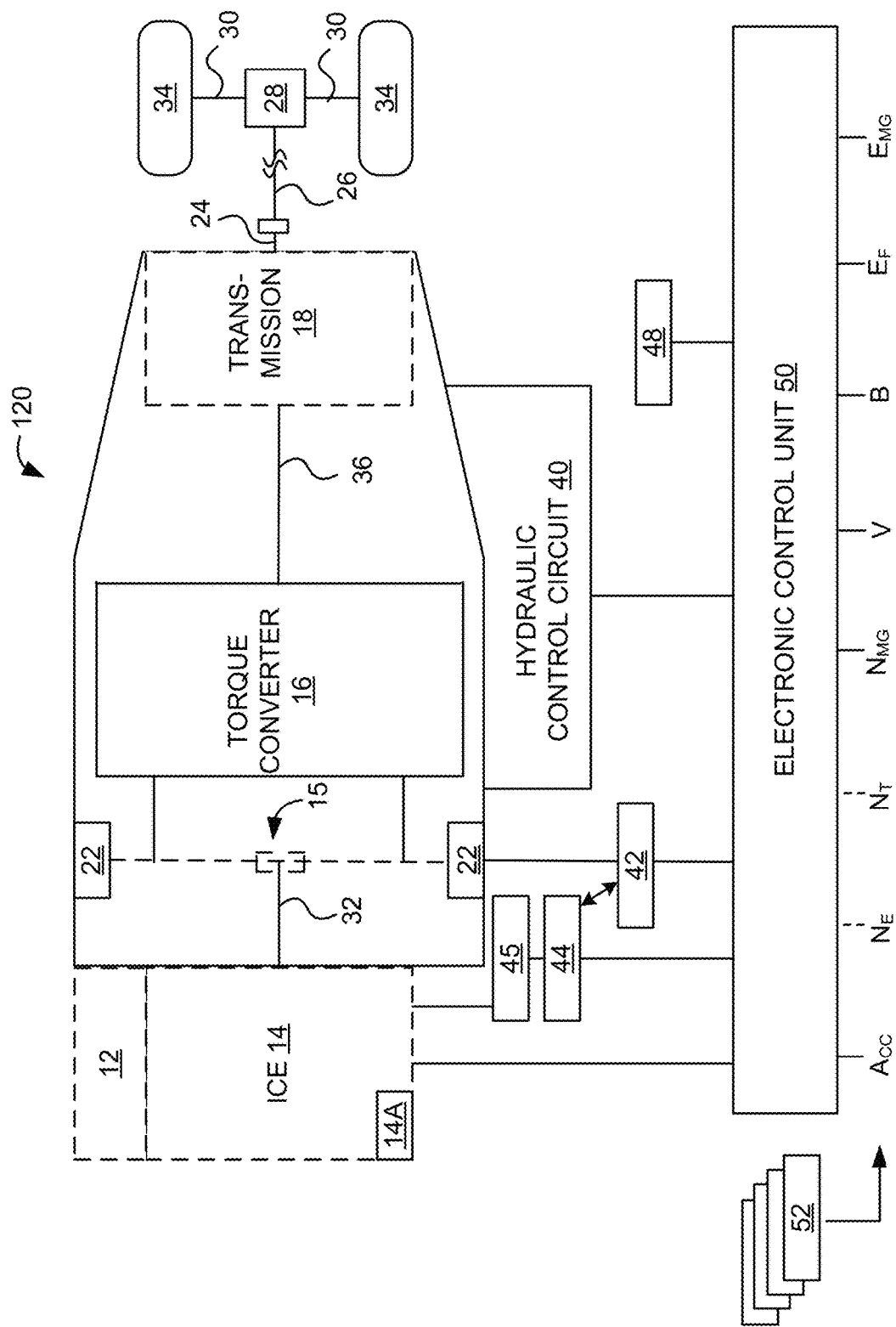
FIG. 2 is a schematic representation of an example vehicle with which embodiments of the safety-aware AI control systems and methods disclosed herein may be implemented.

An example vehicle in which embodiments of the disclosed technology may be implemented is illustrated in FIG. 2. Although the example described with reference to FIG. 2 is a type of vehicle, the systems and methods for hybrid prediction can be implemented in other types of vehicle including gasoline- or diesel-powered vehicles, fuel-cell vehicles, electric vehicles, or other vehicles.

FIG. 2 illustrates a drive system of a vehicle 120 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 120 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 120 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 120 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 120 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 2, electronic control unit 50 receives information from a plurality of sensors included in vehicle 120. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 22 (motor rotational speed), and vehicle speed, NV. These may also include torque converter 16 output, NT (e.g., output amps indicative of motor output), brake operation amount/pressure, B, battery SOC (i.e., the charged amount for battery 44 detected by an SOC sensor). Accordingly, vehicle 120 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 52 can be configured to detect, and/or sense position and orientation changes of the vehicle 120, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 120.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Figure 3:
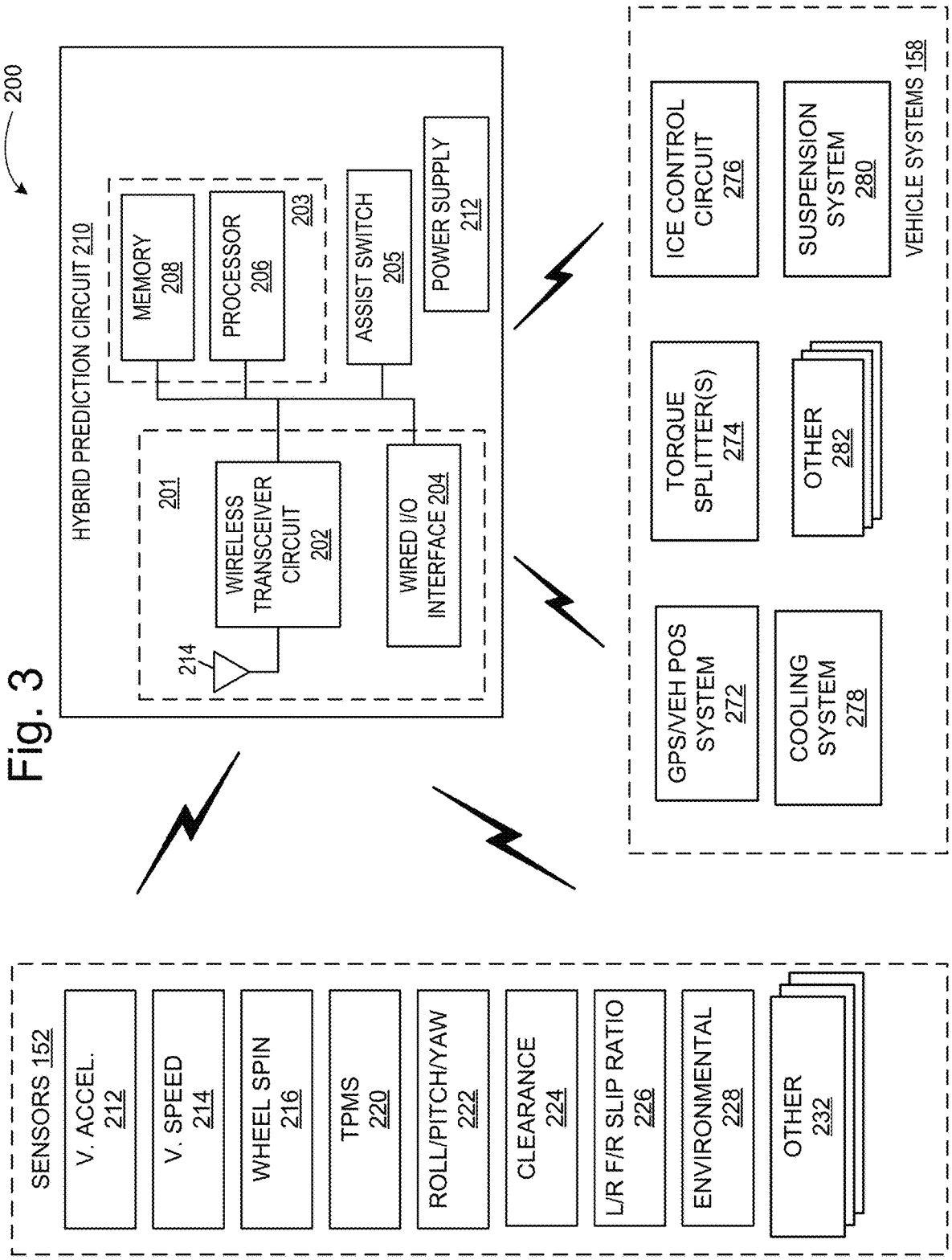
FIG. 3 illustrates an example architecture for a safety-aware AI control mode in accordance with one embodiment of the systems and methods described herein.

FIG. 3 illustrates an example architecture for a hybrid prediction control mode in accordance with one embodiment of the systems and methods described herein. Referring now to FIG. 3, in this example, control system 200 includes a hybrid prediction circuit 210, a plurality of sensors 152, and a plurality of vehicle systems 158. Sensors 152 and vehicle systems 158 can communicate with hybrid prediction circuit 210 via a wired or wireless communication interface. Although sensors 152 and vehicle systems 158 are depicted as communicating with the hybrid prediction circuit 210, they can also communicate with each other as well as with other vehicle systems. Hybrid prediction circuit 210 can be implemented as an ECU or as part of an ECU such as, for example electronic control unit 50. In other embodiments, hybrid prediction circuit 210 can be implemented independently of the ECU.

Hybrid prediction circuit 210 in this example includes a communication circuit 201, a decision circuit (including a processor 206 and memory 208 in this example) and a power supply 212. Components of the hybrid prediction circuit 210 are illustrated as communicating with each other via a data bus, although other communication in interfaces can be included. Hybrid prediction circuit 210 in this example also includes a switch 205 that can be operated by the user to manually select the mode, enabling the disclosed operations in a vehicle.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to the hybrid prediction circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a hybrid prediction circuit 210.

Communication circuit 201 either or both a wireless transceiver circuit 202 with an associated antenna 214 and a wired I/O interface 204 with an associated hardwired data port (not illustrated). As this example illustrates, communications with safety-aware AI circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by hybrid prediction circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 2. Sensors 152 can include additional sensors that may or not otherwise be included on a standard vehicle with which the safety-aware AI system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of safety-aware AI system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, hybrid prediction circuit 210 can receive information from various vehicle sensors 152 to determine whether a safety control (based on the safety properties for operation) should be enabled. Also, the driver may manually activate a safety-aware AI control mode by operating switch 205. Communication circuit 201 can be used to transmit and receive information between safety-aware AI circuit 210 and sensors 152, and safety-aware AI circuit 210 and vehicle systems 158. Also, sensors 152 may communicate with vehicle systems 158 directly or indirectly (e.g., via communication circuit 201 or otherwise).

Artificial neural networks are a family of technical models based on biological nervous systems, which are used to estimate or approximate functions that depend on a large number of inputs. Neural networks may be represented as a system of interconnected "neurons" which exchange messages between each other. The connections may have numerical weights that can be tuned based on experience, making neural networks adaptive to inputs and capable of machine learning. Artificial neural networks may have a variety of applications, including function approximation, classification, data processing, robotics, and computer numerical control. As previously described, DNNs are a type of artificial neural network that can be used as a computational mechanism for various applications. A model of an DNN generated in accordance with the hybrid prediction techniques, which incorporates aspects from a grid representation, is conceptually illustrated in FIG. 4.

Graphically, a DNN as a mathematical construct can be represented as graph 400 of a directed network with nodes 410A-410C (shown as $v_1$, $v_i$, $v_n$), and edges 420A-420f. Edges 420A-420f can be formed between each of the nodes 410A-410C. A computational "problem" can be encoded (or trained) in the edge weights and a threshold function. Input node values can be delivered to the nodes 410A-410C until the computational "answer" to the problem is determined by a final state for the node values. In this manner, an DNN can be a dynamic system, and the node values can evolve based on the edge weightings to all the other node values (e.g., as a dot product operation). The DNN can be "trained" to a set of distinct inputs.

Figure 4:
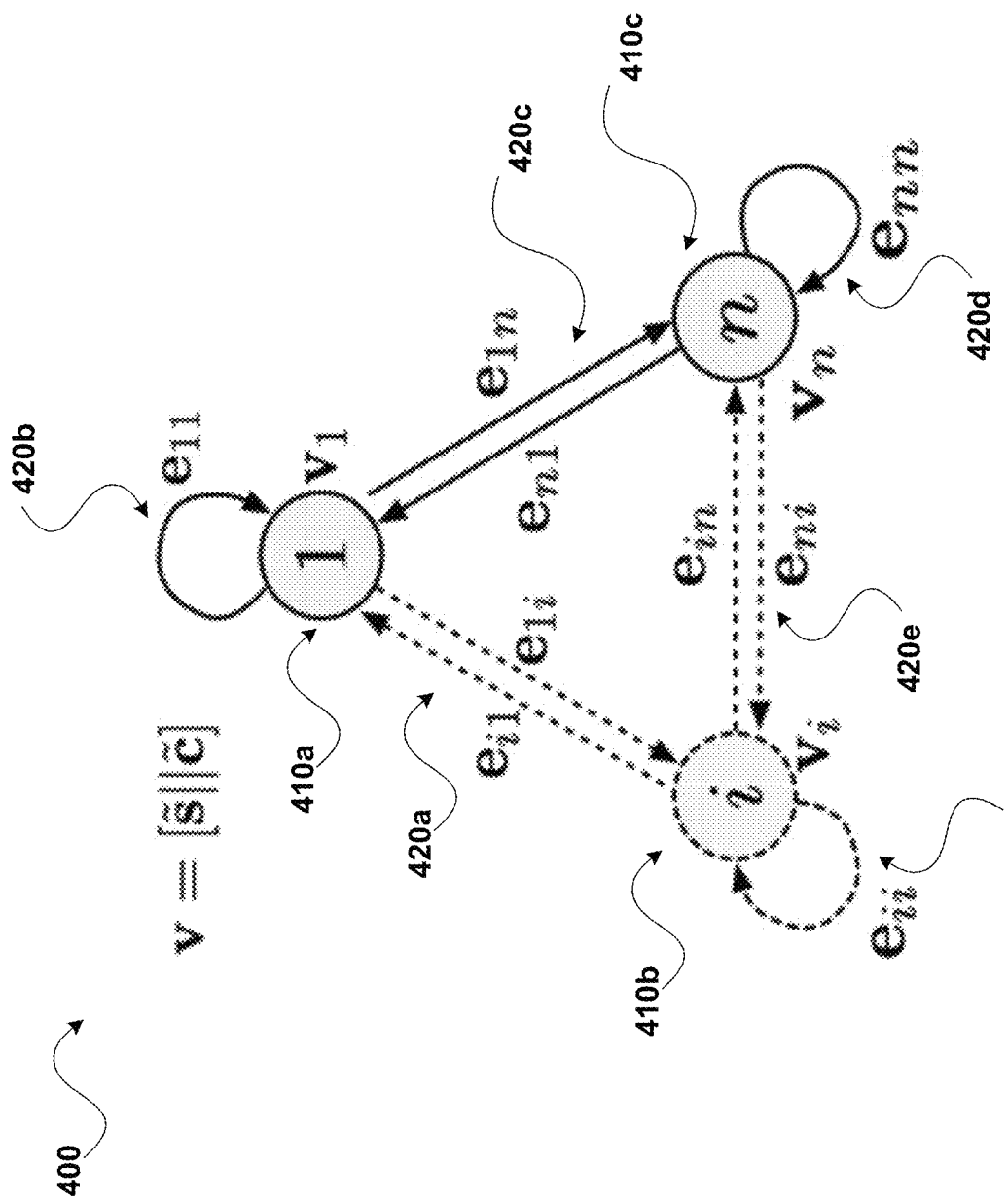
FIG. 4 depicts a conceptual model illustrating an example neural network.

As alluded to above, a physical world including various agents, or objects, can be mathematically modeled, for example being modeled using the neural network approach illustrated in FIG. 4. A modeled neural network, such as a DNN, can then be used as the basis for the hybrid prediction algorithm which implements the disclosed safety-aware control operations (as described in detail with reference to FIG. 1A).

Figure 5:
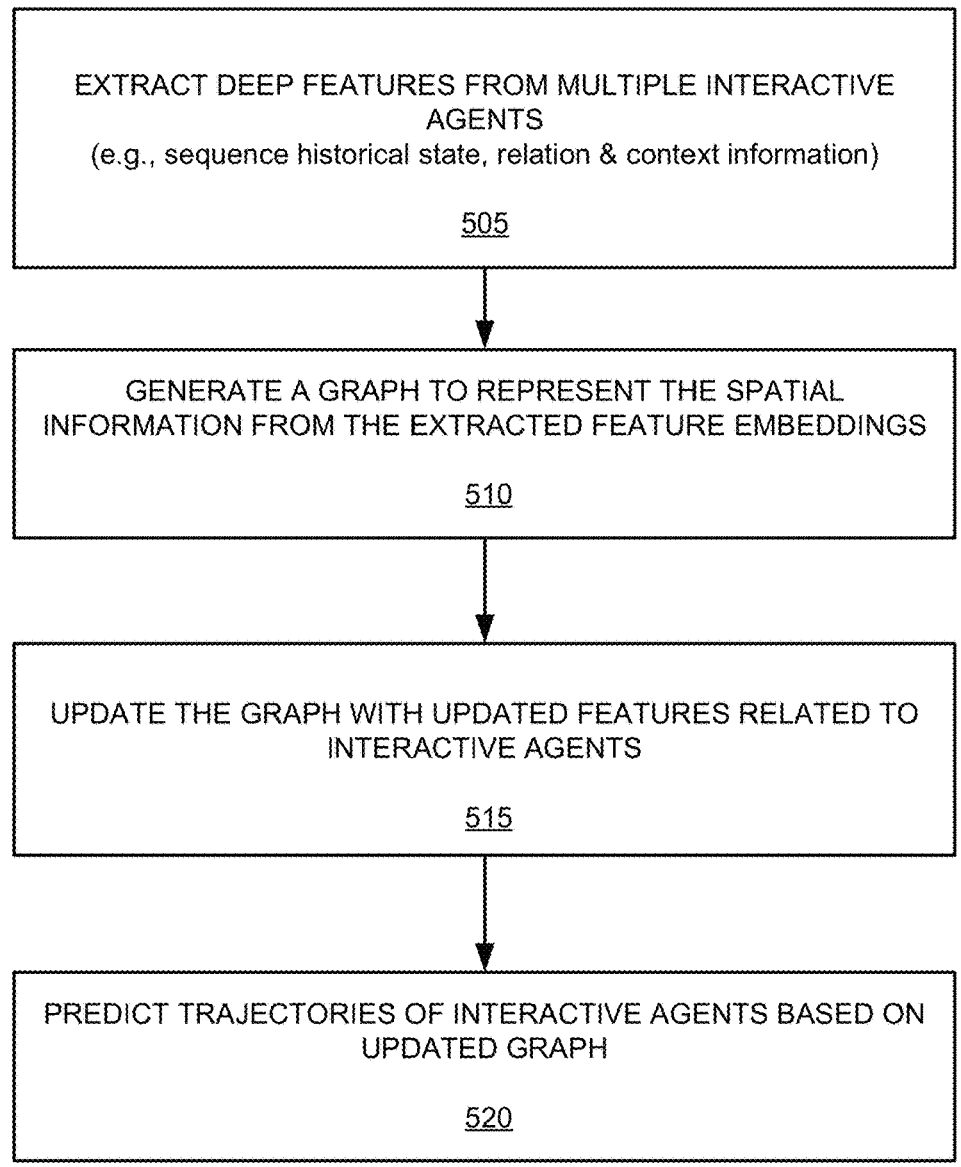
FIG. 5 is a flow chart illustrating example operations for implementing the hybrid prediction techniques, in accordance with one embodiment.

Referring now to FIG. 5, a flowchart for an example process 500 is shown for implementing the disclosed hybrid prediction training techniques. As alluded to above, the process 500 can involve employing a prediction model (emulating the physical world in a graph-based approach via a neural network) to ultimately generate trajectory predictions of surrounding traffic-agents that can be used in guiding and/or controlling a vehicle. That is, a vehicle controller can implement autonomous safety-aware operations based on trajectory predictions to avoid oncoming objects, for example in the case of the vehicle described above in reference to FIG. 1A.

As a general description, the process 500 performs trajectory prediction in a manner that is a hybrid of the graph-based prediction approach and a grid-based prediction approach. The process 500 can being at operation 505, where deep features from multiple interactive agents are extracted. Operation 505 can utilize both historical trajectories of interactive agents and context images to extract deep features of both static and dynamic environments, single-step historical information or a recurrent neural network (RNN) to process multi-step historical information. For systems that satisfy the Markov property, only the current step information is sufficient for long-term prediction. The context information of each agent is represented by a local context RGB image of a given size (W_H) centered on itself. The images are concatenated along an additional time axis. In some cases, three-dimensional (3D) CNNs are used followed by multi-layer perceptron (MLP).

Next, at operation 510 a graph representation can be generated from the spatial information of the extracted feature embeddings. An example of the graph structure and features generated in operation 510 is shown in FIG. 4. The extracted state and context feature embeddings can be concatenated to form the node features; and the extracted relation embeddings are used as the corresponding edge features.

Subsequently, the process can proceed to operation 515. At operation 515, the graph can be updated with features related to interactive agents. The inputs to the graph update layer are a set of node features represented mathematically as:

$$V=\{v_i\}_{i=1:n}, v_i \in R^{F_n} \quad (1)$$

The inputs to the graph update layer can also be a set of edge features represented mathematically as:

$$E=\{e_{ij}\}_{i=1:n, j=1:n}, e_{ij} \in R^{F_e} \quad (2)$$

n=number of nodes (agents)

$F_n$, $F_e$=dimensions of the ode features and node edges, respectively

In most cases, the graph is fully connected without any structural constraints. The output of the updates in operation 515 can be a set of new node features. However, the embodiments do not require that the graph be fully connected.

Thereafter, at operation 520, trajectories of interactive agents can be predicted based on the updated graph. For example, the trajectory predictor (shown in FIG. 1B) takes in the updated node features and generates the state variation of each agent at each future time step. The outputs can be either deterministic values or parameters of probability distributions (e.g. Gaussian or Gaussian mixture). The generation process can be iterative with RNN or one-shot with MLP. The future trajectories can be obtained by accumulating the state variations, and communicated to the controller as output from the hybrid prediction system (shown in FIG. 1B). In some embodiments, the predicted trajectories of interactive agents (e.g., moving vehicles on a roadway) can be applied to perform safety-aware and autonomous operations by a system having autonomous maneuvering capabilities (e.g., autonomous vehicles).

Figure 6:
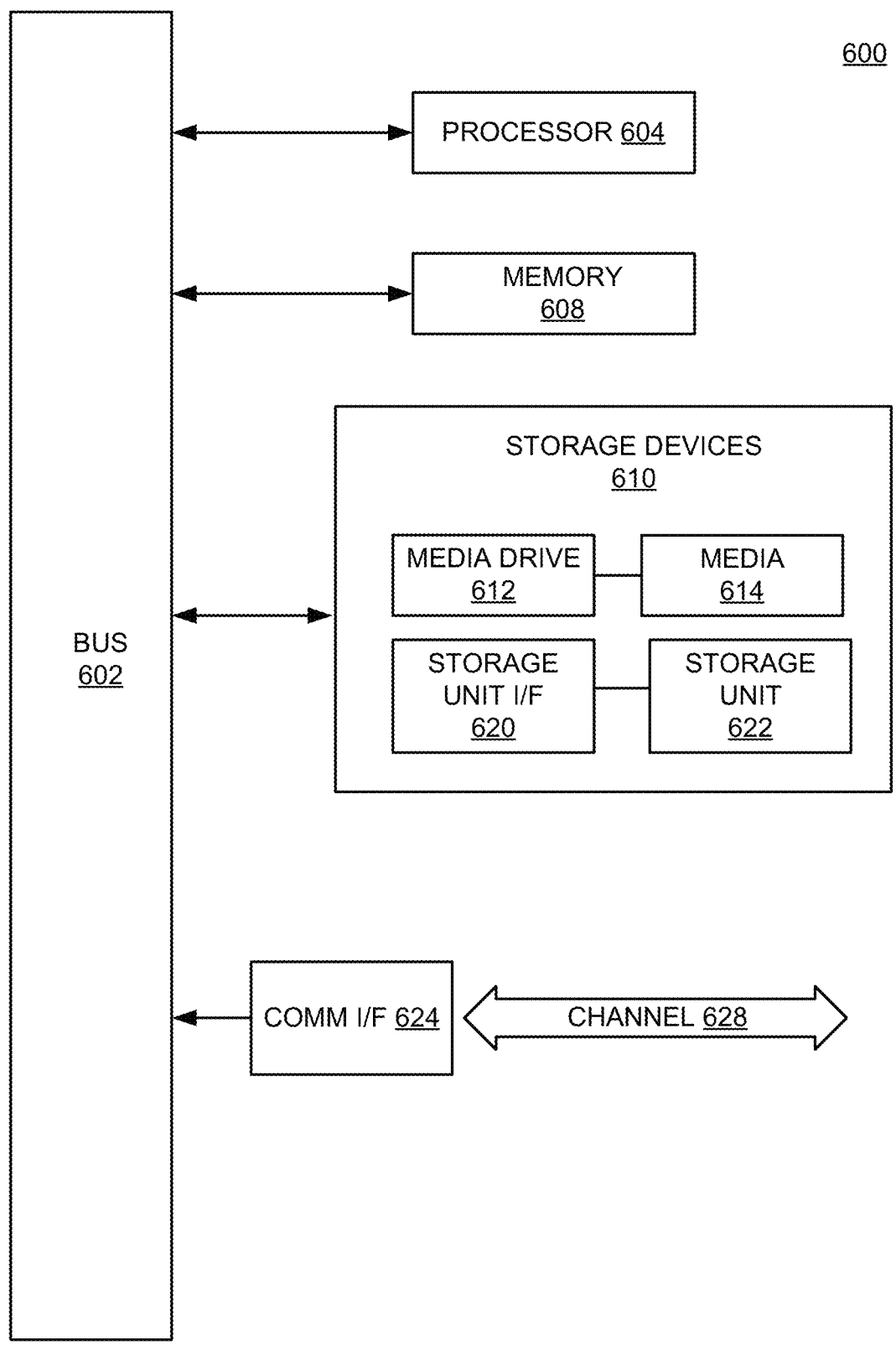
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604.

Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
a hybrid prediction framework processor, wherein the hybrid prediction framework processor integrates graph-based prediction and grid-based prediction, where the integration generates trajectory predictions relating to the movement of agents in a surrounding environment based on a prediction model; and
a controller device, wherein the controller device receives the trajectory predictions as output from the hybrid prediction framework processor and perform safety-aware and autonomous operations of the system in response to the trajectory predictions.

2. The system of claim 1, wherein the system comprises an autonomous vehicle and the agents comprise one or more other vehicles proximate to the autonomous vehicle.

3. The system of claim 2, wherein the trajectory predictions indicate a predicted movement of the other vehicles proximate to the autonomous vehicle.

4. The system of claim 3, wherein the controller device determines a safety-aware impact associated with the predicted movement of the other vehicles proximate to the autonomous vehicle based on the trajectory predictions.

5. The system of claim 4, wherein hybrid prediction framework processor receives information relating to historical movement of the other vehicles proximate to the autonomous vehicle from one or more vehicle sensors.

6. The system of claim 1, wherein the hybrid prediction framework processor comprises:
a feature extractor that extracts deep features from a sequence of historical state, relation and context information relating to the movement of agents in a surrounding environment.

7. The system of claim 6, wherein the hybrid prediction framework processor comprises:
a graph update analyzer that generates and updates a graph representing the movement of agents in the surrounding environment based on extracted features.

8. The system of claim 7, wherein the hybrid prediction framework processor comprises:
a trajectory predictor that generates the predicted trajectories corresponding to the agents based on the graph, wherein the predicted trajectories indicate a predicted future movement of the agents.

9. A hybrid prediction method, comprising:
extracting one or more deep features from information relating to multiple interactive agents, wherein the one or more deep features are associated with a grid including a spatial representation of the interactive agents;
generating a graph based on extracted features, wherein the graph includes the spatial representation from the grid via the extracted features;
updating the graph with updated node features, wherein the updated node features relate to the multiple interactive agents; and
predicting trajectories related to the interactive agents based on the updated graph, wherein the predicted trajectories integrate graph-based prediction and grid-based prediction.

10. The method of claim 9, wherein the extracting deep features comprises applying historical trajectories of interactive agents and context images.

11. The method of claim 10, wherein extracting deep features comprises information from static and dynamic environments.

12. The method of claim 9, wherein generating the graph based on the extracted features comprises:
concatenating extracted state feature embeddings and extracted context feature embeddings, and
forming nodes of the graph from the concatenated state feature embeddings and the context feature embeddings.

13. The method of claim 12, wherein generating the graph further comprises:
forming edges of the graph from extracted relation embeddings.

14. The method of claim 13, wherein updating the graph comprises applying the spatial representation of the interactive agents from the grid.

15. The method of claim 9, wherein predicting trajectories comprises generating a state variation of the interactive agents at a plurality of future time steps from the updated node features.

16. The method of claim 15, wherein the state variations comprise deterministic values.

17. The method of claim 16, wherein the state variations comprise parameters of probability distributions.

18. The method of claim 9, further comprising:
performing safety-aware and autonomous operations of a system in response to the predicted trajectories related to the interactive agents.

19. The method of claim 18, wherein the system comprises an autonomous vehicle.

* * * * *